US012586421B2

(12) United States Patent
Kim et al.

(10) Patent No.: US 12,586,421 B2
(45) Date of Patent: Mar. 24, 2026

(54) ELECTRONIC DEVICE AND BIOMETRIC AUTHENTICATION METHOD USING SAME

(71) Applicant: Samsung Electronics Co., Ltd., Suwon-si (KR)

(72) Inventors: Minchul Kim, Suwon-si (KR); Tanil Kim, Suwon-si (KR); Hyeonho Kim, Suwon-si (KR); Siwoo Lee, Suwon-si (KR); Jaejeong Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 221 days.

(21) Appl. No.: 18/538,523

(22) Filed: Dec. 13, 2023

(65) Prior Publication Data

US 2024/0112501 A1      Apr. 4, 2024

Related U.S. Application Data

(63) Continuation of application No. PCT/KR2022/006533, filed on May 9, 2022.

(30) Foreign Application Priority Data

Jun. 15, 2021      (KR) ........................ 10-2021-0077224
Oct. 18, 2021      (KR) ........................ 10-2021-0138329

(51) Int. Cl.
$G06V$ *40/70*          (2022.01)
$G06F$ *21/32*          (2013.01)
(Continued)

(52) U.S. Cl.
CPC .............. *$G06V$ 40/70* (2022.01); *$G06F$ 21/32* (2013.01); *$G06V$ 40/13* (2022.01); *$G06V$ 40/1365* (2022.01); *$G06V$ 40/172* (2022.01)

(58) Field of Classification Search
CPC .... G06V 40/70; G06V 40/13; G06V 40/1365; G06V 40/172; G06V 40/1318; G06F 21/32
See application file for complete search history.

(56) References Cited

U.S. PATENT DOCUMENTS 9,547,760 B2      1/2017   Kang et al.
10,942,997 B2     3/2021   Kao
                  (Continued)

FOREIGN PATENT DOCUMENTS

JP        2007-151941 A      6/2007
JP        2010-224903 A      10/2010
                  (Continued)

OTHER PUBLICATIONS

International Search Report dated Aug. 23, 2023, issued in International Patent Application No. PCT/KR2022/006533.
(Continued)

*Primary Examiner* — Wassim Mahrouka
(74) *Attorney, Agent, or Firm* — Jefferson IP Law, LLP

(57)                ABSTRACT

An electronic device is provided. The electronic device includes a fingerprint sensor, a camera, and a processor operatively coupled to the fingerprint sensor and the camera. The processor may be configured to determine whether a plurality of biometric authentications are being performed when an input for performing user authentication is detected through the fingerprint sensor, stop user authentication using the camera if it is determined that the plurality of biometric authentications are being performed, and perform user authentication if a fingerprint image acquired through the fingerprint sensor matches a previously registered fingerprint image.

20 Claims, 7 Drawing Sheets

(51) Int. Cl.

| | |
|---|---|
| *G06V 40/12* | (2022.01) |
| *G06V 40/13* | (2022.01) |
| *G06V 40/16* | (2022.01) |

(56) References Cited

U.S. PATENT DOCUMENTS

| | | | |
|---|---|---|---|
| 11,188,628 | B2 | 11/2021 | Mccarty et al. |
| 11,271,915 | B2 | 3/2022 | Kohli |
| 11,496,470 | B2 | 11/2022 | Bhargava et al. |
| 2008/0122577 | A1 | 5/2008 | Gutta et al. |
| 2019/0342298 | A1 | 11/2019 | Chen et al. |
| 2020/0004940 | A1 | 1/2020 | Cho et al. |
| 2020/0026939 | A1 | 1/2020 | Sim et al. |
| 2020/0167456 | A1 | 5/2020 | Sato |
| 2020/0241917 | A1 | 7/2020 | Chen et al. |

FOREIGN PATENT DOCUMENTS

| | | | |
|---|---|---|---|
| JP | 4687045 | B2 | 5/2011 |
| JP | 2014-099127 | A | 5/2014 |
| KR | 10-2006-0009333 | A | 1/2006 |
| KR | 10-2008-0030599 | A | 4/2008 |
| KR | 10-2013-0097581 | A | 9/2013 |
| KR | 10-2018-0097360 | A | 8/2018 |
| KR | 10-2020-0060421 | | 5/2020 |
| KR | 10-2020-0092225 | A | 8/2020 |
| WO | 2019/212263 | A1 | 11/2019 |

OTHER PUBLICATIONS

Extended European Search Report dated Oct. 9, 2024, issued in European Application No. 22825154.2-1207.

Indian Office Action dated Nov. 21, 2025, issued in Indian Application No. 202317085481.

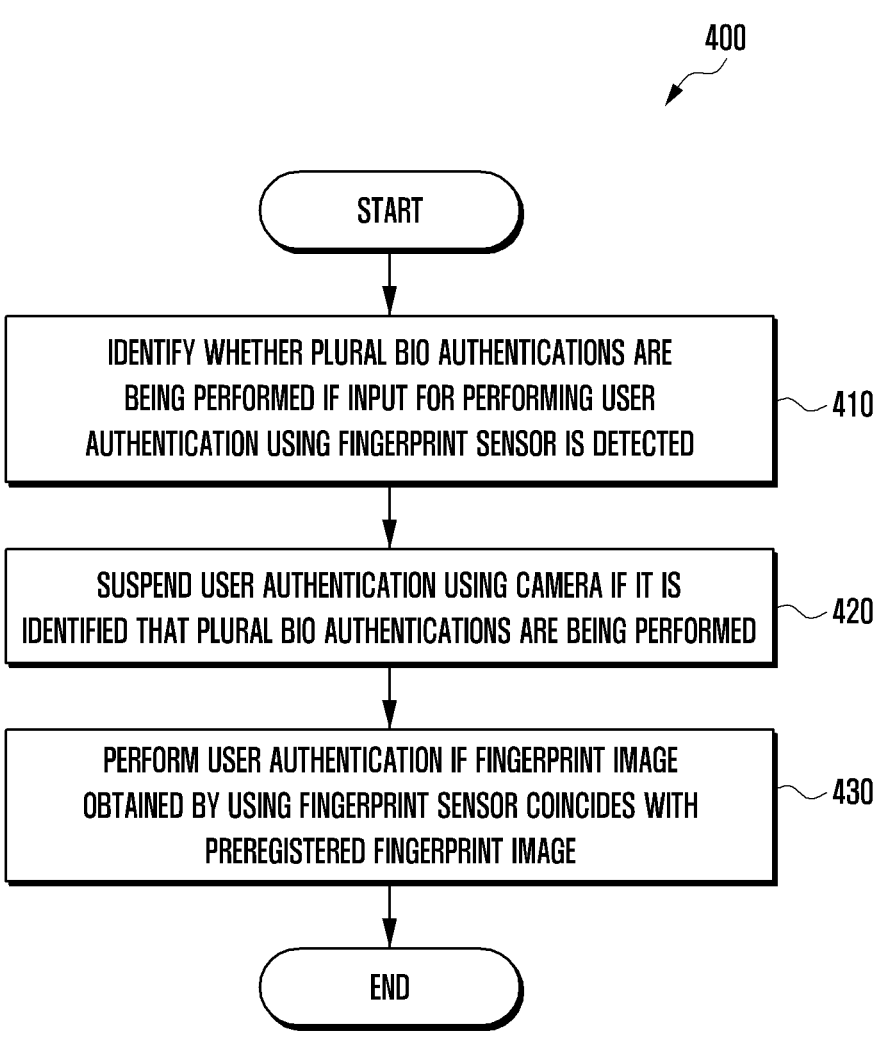

400

START

IDENTIFY WHETHER PLURAL BIO AUTHENTICATIONS ARE
BEING PERFORMED IF INPUT FOR PERFORMING USER
AUTHENTICATION USING FINGERPRINT SENSOR IS DETECTED — 410

SUSPEND USER AUTHENTICATION USING CAMERA IF IT IS
IDENTIFIED THAT PLURAL BIO AUTHENTICATIONS ARE BEING PERFORMED — 420

PERFORM USER AUTHENTICATION IF FINGERPRINT IMAGE
OBTAINED BY USING FINGERPRINT SENSOR COINCIDES WITH
PREREGISTERED FINGERPRINT IMAGE — 430

END

ELECTRONIC DEVICE AND BIOMETRIC AUTHENTICATION METHOD USING SAME

CROSS-REFERENCE TO RELATED APPLICATION(S)

This application is a continuation application, claiming priority under § 365(c), of an International application No. PCT/KR2022/006533, filed on May 9, 2022, which is based on and claims the benefit of a Korean patent application number 10-2021-0077224, filed on Jun. 15, 2021, in the Korean Intellectual Property Office, and of a Korean patent application number 10-2021-0138329, filed on Oct. 18, 2021, in the Korean Intellectual Property Office, the disclosure of each of which is incorporated by reference herein in its entirety.

BACKGROUND

Field

The disclosure relates to an electronic device and a bio authentication method using the same.

Description of Related Art

An electronic device may provide a plurality of bio authentication functions. For example, in order to perform a user authentication, the electronic device may obtain plural pieces of bio information (e.g., fingerprint information, face information, and iris information) for a user from a plurality of sensors, for example, a fingerprint sensor and an image sensor. The electronic device may perform the user authentication based on the first matching bio information among the plural pieces of bio information that are obtained through the plurality of sensors.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device and a bio authentication method using the same.

However, since the plural pieces of bio information are obtained through the plurality of sensors in order to perform the user authentication, it may take a long time to perform the user authentication.

Another aspect of the disclosure is to provide an electronic device which controls at least one other bio authentication to be temporarily suspended in case that an input for performing a user authentication using one of a plurality of bio authentication functions is detected.

Another aspect of the disclosure is to provide an electronic device which controls to heighten a central processing unit (CPU) occupancy rate of a process that performs a bio authentication function having a high usage rate among a plurality of bio authentication functions based on information related to the plurality of bio authentication functions.

Another aspect of the disclosure is to provide an electronic device which provides a notification notifying of a bio authentication function that is not used for a specified period of time among a plurality of bio authentication functions based on information related to the plurality of bio authentication functions.

Additional aspects will be set forth in part in the description which follows and, in part, will be apparent from the description, or may be learned by practice of the presented embodiments.

In accordance with an aspect of the disclosure, an electronic device is provided. The electronic device includes a fingerprint sensor, a camera, and a processor operatively connected to the fingerprint sensor and the camera, wherein the processor is configured to identify whether a plurality of bio authentications are being performed in case that an input for performing a user authentication using the fingerprint sensor is detected, suspend a user authentication using the camera in case that it is identified that the plurality of bio authentications are being performed, and perform the user authentication in case that a fingerprint image obtained by using the fingerprint sensor coincides with a preregistered fingerprint image.

In accordance with another aspect of the disclosure, a bio authentication method of an electronic device is provided. The bio authentication method includes identifying whether a plurality of bio authentications are being performed in case that an input for performing a user authentication using a fingerprint sensor is detected, suspending a user authentication using a camera in case that it is identified that the plurality of bio authentications are being performed, and performing the user authentication in case that a fingerprint image obtained by using the fingerprint sensor coincides with a previously registered fingerprint image.

Since the electronic device according to various embodiments of the disclosure controls at least one other bio authentication to be temporarily suspended in case that the input for performing the user authentication using one of a plurality of bio authentication functions is detected, it is possible to speed up the performing of the user authentication.

Since the electronic device according to various embodiments of the disclosure controls to heighten the CPU occupancy rate of the process that performs the bio authentication function having a high usage rate among the plurality of bio authentication functions, it is possible to shorten the time required to perform the user authentication.

Since the electronic device according to various embodiments of the disclosure derives a release of the bio authentication function that is not used for a specified period of time by providing the notification notifying of the bio authentication function that is not used for the specified period of time, it is possible not only to shorten the time required to perform the user authentication but also to improve the bio recognition performance.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1 is a block diagram of an electronic device in a network environment according to an embodiment of the disclosure;

FIG. 4 is a flowchart illustrating a bio authentication method according to an embodiment of the disclosure;

The same reference numerals are used to represent the same elements throughout the drawings.

DETAILED DESCRIPTION

Figure 2:
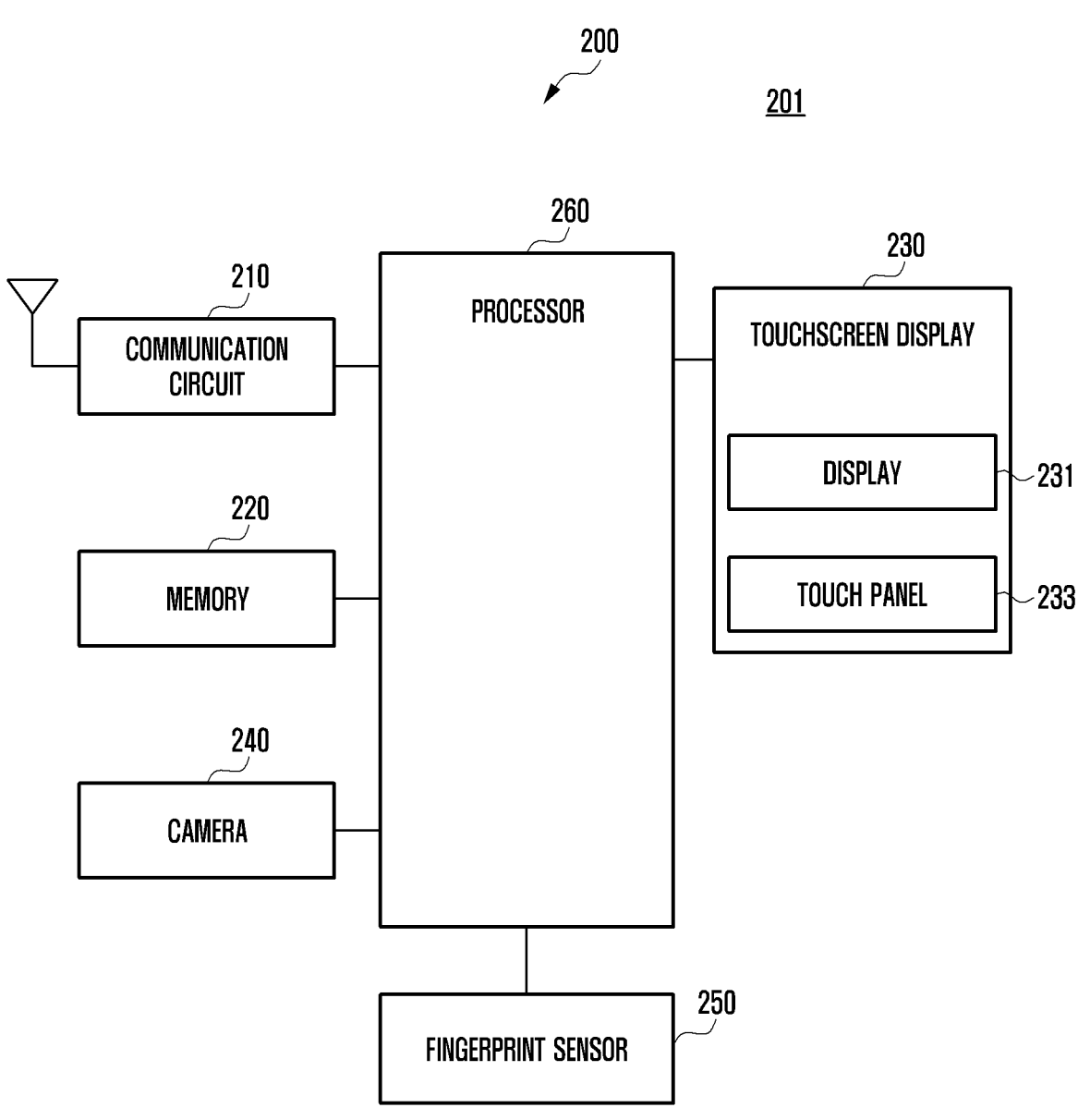
FIG. 2 is a block diagram illustrating an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
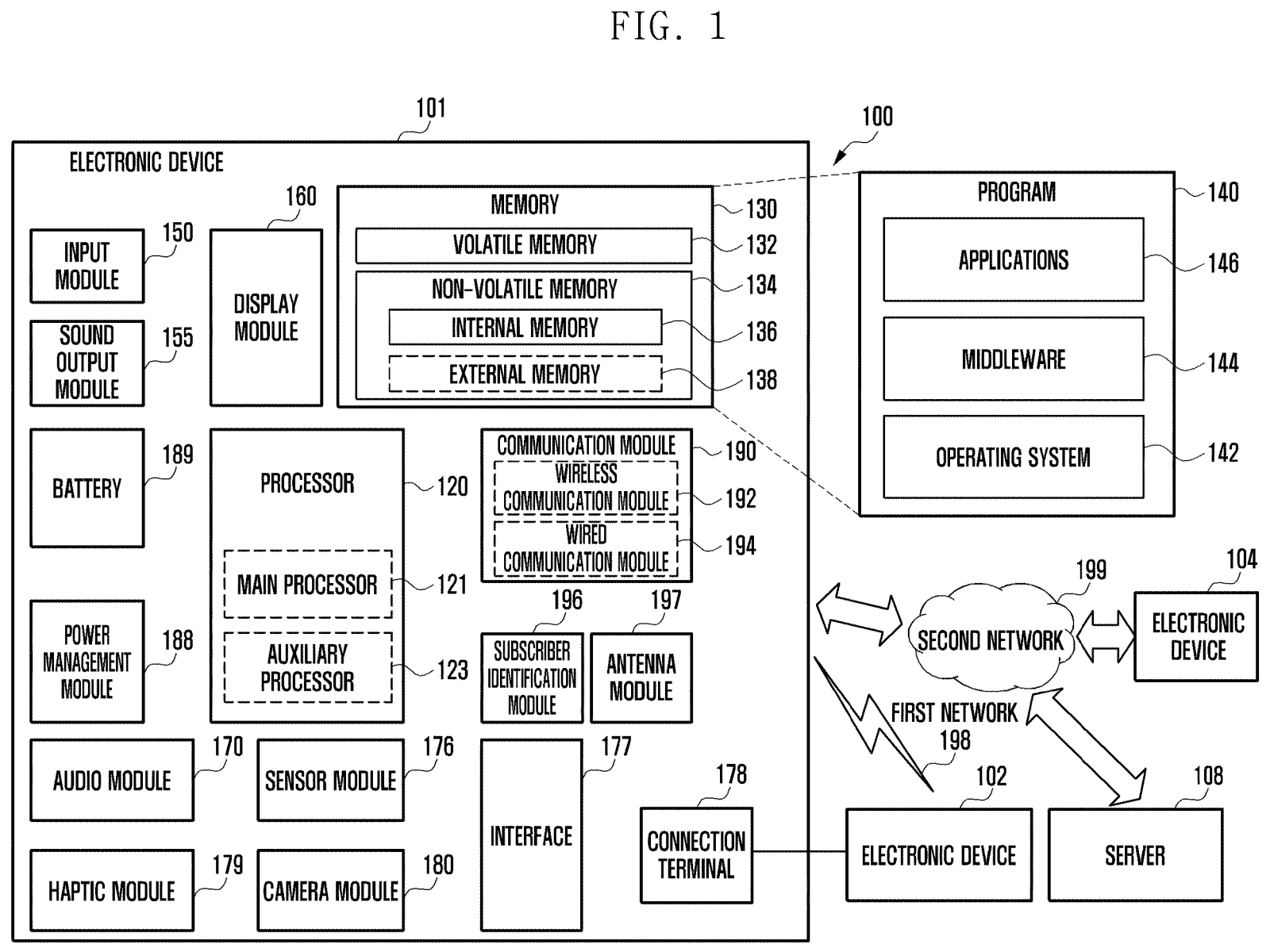

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connection terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and/or an external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) (e.g., speaker or headphone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., through wires) or wirelessly. According to an embodiment of the disclosure, the interface 177 may include, for example, a high-definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., the external electronic device 102). According to an embodiment of the disclosure, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., an application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form mmWave antenna module. According to an embodiment of the disclosure, the mmWave antenna module may include a printed circuit board, an RFIC disposed on a first surface (e.g., the bottom surface) of the printed circuit board, or adjacent to the first surface and capable of supporting a designated high-frequency band (e.g., an mmwave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., a smart home, a smart city, a smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., through wires), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

FIG. 2 is a block diagram 200 illustrating an electronic device according to an embodiment of the disclosure.

Referring to FIG. 2, an electronic device 201 (e.g., electronic device 101 of FIG. 1) may include a communication circuit 210 (e.g., communication module 190 of FIG. 1), a memory 220 (e.g., the memory 130 of FIG. 1), a touchscreen display 230 (e.g., display module 160 of FIG. 1), a camera 240 (e.g., camera module 180 of FIG. 1), a fingerprint sensor 250, and/or a processor 260 (e.g., processor 120 of FIG. 1).

In various embodiments of the disclosure, the communication circuit 210 (e.g., communication module 190 of FIG. 1) may control a communication connection between the electronic device 201 and at least one external electronic device under the control of the processor 260.

In various embodiments of the disclosure, the memory 220 (e.g., the memory 130 of FIG. 1) may perform storing of a program (e.g., program 140 of FIG. 1) for processing and control of the processor 260 of the electronic device 201, the operating system (OS) (e.g., operating system 142 of FIG. 1), various applications, and/or input/output data, and may store a program that controls the overall operation of the electronic device 201. The memory 220 may store various pieces of configuration information required to process functions related to various embodiments of the disclosure.

In various embodiments of the disclosure, the memory 220 may include a security area. In an embodiment of the disclosure, the security area may store personal information related to a user and at least one piece of authentication information (e.g., fingerprint information, face information, and/or iris information). In relation to this, various embodiments will be described with reference to FIG. 3 to be described later.

In various embodiments of the disclosure, the touchscreen display 230 (e.g., display module 160 of FIG. 1) may be integrally constituted to include a display 231 and a touch panel 233.

In an embodiment of the disclosure, the touchscreen display 230 may display an image under the control of the processor 260, and may be implemented by any one of a liquid crystal display (LCD), a light-emitting diode (LED) display, an organic light-emitting diode (OLED) display, a micro electro mechanical systems (MEMS) display, an electronic paper display, or a flexible display, but is not limited thereto.

In an embodiment of the disclosure, if an input for requesting a user authentication is detected, the touchscreen display 230 may display a graphic element (e.g., user interface (UI)) for guiding to be able to perform a bio authentication under the control of the processor 260. For example, if an input for releasing a lock screen, an input for account authentication (e.g., login) in a certain web site, or an input for using a payment service is detected, the touchscreen display 230 may display a graphic element (e.g., graphic element including an image that resembles a fingerprint) for guiding to be able to perform a fingerprint recognition on one area (e.g., area on which the fingerprint sensor 250 is disposed) of the screen (e.g., the lock screen, web site screen, or payment screen) under the control of the processor 260.

In an embodiment of the disclosure, the touchscreen display 230 may display a user interface for the result of the user authentication under the control of the processor 260. The touchscreen display 230 may display a user interface for notifying of the existence of a bio authentication type that is not used for a specified period of time under the control of the processor 260.

According to various embodiments of the disclosure, the camera 240 (e.g., camera module 180 of FIG. 1) may obtain an image, and may transfer the obtained image to the processor 260. The processor 260 may perform the user authentication by extracting feature vectors of a user's face based on the image received from the camera 240 and comparing the extracted face feature vectors with pre-stored face feature vectors. For example, the processor 260 may extract features of a face area, an eye area, and a mouth area from the face detected from the image obtained through the camera 240. The processor 260 may extract the face feature vectors from the extracted areas. The processor may perform the user authentication using the face by comparing the face feature vectors that are unique features of the extracted face with face information preregistered in the memory 220.

In various embodiments of the disclosure, the fingerprint sensor 250 may recognize a fingerprint input from the user, and may obtain a fingerprint image (or fingerprint feature) of a finger representing the user's unique characteristic difference. For example, the fingerprint sensor 250 may extract unique features of the fingerprint from the obtained fingerprint image, and may provide (e.g., transfer) the extracted features to the processor 260 as fingerprint information. For example, the extracted features (e.g., fingerprint minutiae) may include a ridge ending, crossover, bifurcation, and/or pore included in the fingerprint. However, the extracted features are not limited thereto.

In an embodiment of the disclosure, the fingerprint sensor 250 may be disposed on a part below (e.g., under panel) of the touchscreen display 230. The disposition of the fingerprint sensor 250 is not limited thereto, and in another embodiment of the disclosure, the fingerprint sensor 250 may be disposed between the touchscreen display 230 located on a front surface of the electronic device 201 and a rear surface of the electronic device 201. In still another embodiment of the disclosure, the fingerprint sensor 250 may include an overall fingerprint sensor having an area corresponding to the entire surface (e.g., overall area) of the touchscreen display 230 (e.g., capable of supporting the fingerprint recognition through the entire surface of the touchscreen display 230).

In an embodiment of the disclosure, the fingerprint sensor 250 may be implemented in an optical method, an ultrasonic method, and/or a capacitance method.

In various embodiments of the disclosure, the processor 260 (e.g., processor 120 of FIG. 1) may include one or more of a central processing unit (CPU), an application processor (AP), or a communication processor (CP). The processor 260 may execute, for example, an arithmetic operation or data processing regarding the control and/or communication of at least one other constituent elements of the electronic device 201.

In an embodiment of the disclosure, if an input for performing the user authentication using the fingerprint sensor 250 is detected, the processor 260 may identify whether a plurality of bio authentications are being performed. The operation of identifying whether the plurality of bio authentications are being performed may be a type for performing the user authentication against the electronic device 201, and may be an operation of identifying whether a plurality of bio authentication types have been configured. For example, the configured bio authentication types may include at least two of a user authentication using the fingerprint, a user authentication using a face, or a user authentication using an iris. However, the user authentications are not limited thereto. If it is identified that a plurality of bio authentications are being performed, the processor 260 may pause the user authentication using the camera 240, and may obtain the fingerprint image by using the fingerprint sensor 250. If the fingerprint image obtained by using the fingerprint sensor 250 coincides with a preregistered fingerprint image, the processor 260 may perform the user authentication.

In an embodiment of the disclosure, if it is identified that the adjust of the occupancy rate of the processor 260 allocated to the process of performing each of the plurality of bio authentications is necessary based on the result of performing the user authentication, the processor 260 may adjust the occupancy rate of the processor 260 allocated to the process of performing each of the plurality of bio authentications. For example, the processor may adjust the occupancy rate of the processor 260 allocated to the process that performs a specific bio authentication to be heightened based on the updated information related to the bio authentication type used for the user authentication in case that a usage rate of the specific bio authentication used for a specified period of time among the configured plural bio authentications is higher than a usage rate of at least one other bio authentication.

In an embodiment of the disclosure, the processor 260 may identify the information related to the bio authentication type used for the user authentication (e.g., information about the bio authentication type used for the user authentication and/or information about the number of user authentications performed using the bio authentication type), and based on this, it may identify whether a bio authentication type that is not used for the specified period of time exists. If the bio authentication type that is not used for the specified period of time exists, the processor 260 may output a notification notifying of the existence of the bio authentication type that is not used for the specified period of time. For example, the processor 260 may display, on the touchscreen display 230, a user interface including a text notifying of the existence of the bio authentication type that is not used for the specified period of time or a text deriving a release of the bio authentication type that is not used for the specified period of time. The above notification is not limited thereof, and the processor 260 may output the notification notifying of the existence of the bio authentication type that is not used for the specified period of time or the notification deriving the release of the bio authentication type that is not used for the specified period of time as sound through the speaker (e.g., sound output module 155 of FIG. 1) (or as vibrations through the haptic module (e.g., haptic module 179 of FIG. 1)). If the input for releasing the bio authentication type that is not used for the specified period of time is detected, the processor 260 may perform the user authentication, and may release the bio authentication type that is not used for the specified period of time.

The electronic device 201 according to various embodiments may include the fingerprint sensor 250, the camera 240, and the processor 260 operatively connected to the fingerprint sensor 250 and the camera 240, wherein the processor 260 may be configured to: identify whether a plurality of bio authentications are being performed in case that an input for performing a user authentication using the fingerprint sensor 250 is detected, suspend a user authentication using the camera 240 in case that it is identified that the plurality of bio authentications are being performed, and perform the user authentication in case that a fingerprint image obtained by using the fingerprint sensor 250 coincides with a previously registered fingerprint image.

In various embodiments of the disclosure, the processor 260 may be configured to resume the paused user authentication using the camera 240 in case that processing of the fingerprint image obtained by using the fingerprint sensor 250 is ended.

The electronic device 201 according to various embodiments may further includes the memory 220, wherein the processor 260 may be configured to store information related to a bio authentication type used for the user authentication in the memory 220 based on a result of performing the user authentication.

In various embodiments of the disclosure, information related to the bio authentication used for the user authentication may include at least one of information about the bio authentication type used for the user authentication or information about the number of user authentications performed using the bio authentication type.

In various embodiments of the disclosure, the processor 260 may be configured to identify an occupancy rate of the processor 260 allocated to a process that performs each of the plurality of bio authentications in case that it is identified that the plurality of bio authentications are being performed, and perform the user authentication using the fingerprint sensor 250 based on the occupancy rate of the processor 260.

In various embodiments of the disclosure, the processor 260 may be configured to: update the information related to the bio authentication type used for the user authentication based on the result of performing the user authentication using the fingerprint sensor, identify whether an adjust of the occupancy rate of the processor 260 allocated to the process that performs each of the plurality of bio authentications is necessary, and adjust the occupancy rate of the processor 260 allocated to the process that performs each of the plurality of bio authentications in case that it is identified that the adjust of the occupancy rate of the processor 260 allocated to the process that performs each of the plurality of bio authentications is necessary.

In various embodiments of the disclosure, the processor 260 may be configured to identify that the adjust of the occupancy rate of the processor 260 allocated to the process that performs each of the plurality of bio authentications is necessary based on the updated information related to the bio authentication type used for the user authentication in case that a usage rate of a specific bio authentication used for a specified period of time among the plurality of bio authentications is higher than a usage rate of at least one other bio authentication.

In various embodiments of the disclosure, the processor 260 may be configured to adjust a run time and/or an execution occupancy rate of each of the plurality of bio authentications allocated to the processor 260 based on the updated information related to the bio authentication type used for the user authentication.

In various embodiments of the disclosure, the processor may be configured to: identify whether a bio authentication type that is not used for a specified period of time exists based on the information related to the bio authentication type used for the user authentication, and output a notification notifying of an existence of the bio authentication type that is not used for the specified period of time in case that the bio authentication type that is not used for the specified period of time exists.

In various embodiments of the disclosure, the processor may be configured to: obtain a face image by using the camera 240 in case that the input for performing the user authentication using the fingerprint sensor 250 is not detected, and perform the user authentication in case that the face image obtained by using the camera 240 coincides with a previously registered face image.

Figure 3:
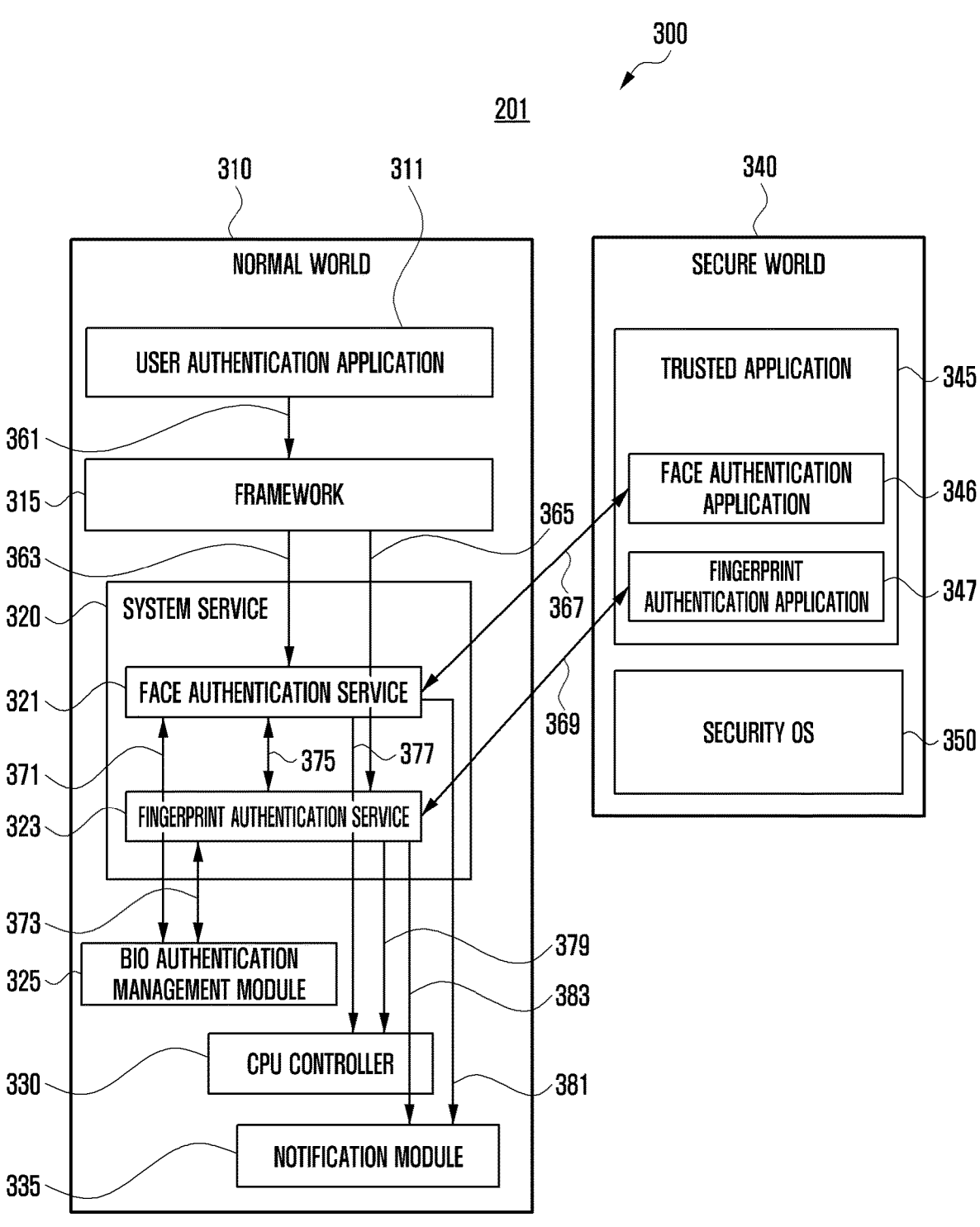
FIG. 3 is a diagram illustrating a signal flow between a rich execution environment (REE) and a trusted execution environment (TEE), being operated by an electronic device, according to an embodiment of the disclosure.

FIG. 3 is a diagram 300 illustrating a signal flow between a rich execution environment (REE) 310 and a trusted execution environment (TEE) 340, being operated by an electronic device 201, according to an embodiment of the disclosure.

Referring to FIG. 3, an electronic device (e.g., electronic device 201 of FIG. 2) may operate execution environments having a plurality of security levels for increased security. For example, the plurality of execution environments may include the REE 310 and the TEE 340. The REE 310 may be, for example, a first execution environment having a first security level. The TEE 340 may be, for example, a second execution environment having a second security level that is different from (e.g., higher than) the first security level. For example, a security area 340 may store data that requires a relatively high security level in a safe environment, and may perform a related operation. The security area 340 may operate on an application processor (AP) (e.g., the main processor 121 of FIG. 1) of the electronic device 201, and may operate based on a trusted hardware structure determined in a process of manufacturing the electronic device 201. In an embodiment of the disclosure, the security area 340 may mean an area in which software or hardware requiring the security operates. The electronic device 201 may operate the security area 340 through a physical change of hardware or a logical change of software.

In an embodiment of the disclosure, the REE 310 may be defined as a normal world, and the TEE 340 may be defined as a secure world.

In an embodiment of the disclosure, the normal world 310 may include an application, a framework 315, a system service 320, a bio authentication management module 325, a CPU controller 330, and/or a notification module 335.

In an embodiment of the disclosure, the secure world 340 may include a trusted application 345 and/or a security OS 350. For example, the trusted application 345 may be an application that is necessary for the operation of the secure world 340 or a security application that is called for secure authentication and authorization in a security-required process, such as kernel data introspection or attestation. The security OS 350 may be an operating system to which security technology is applied. For example, the trusted application 345 may operate in the security OS 350.

In an embodiment of the disclosure, the application of the normal world 310 may include an application executable by the processor (e.g., processor 260 of FIG. 2) and a system user interface (UI) (not illustrated). The application may include a user authentication application 311. For example, if it is configured to perform the user authentication in order to release a lock screen, the user authentication application 311 may include an application (e.g., key guard) that manages the lock screen. The user authentication application 311 is not limited thereto, and may include an application for an account authentication (e.g., login) or an application for performing payment in a certain web site. In an embodiment of the disclosure, although not illustrated, the application may include applications executable in the electronic device 201, such as an Internet browser application, a video application, a camera application, and/or a game application.

In an embodiment of the disclosure, if an input for requesting an execution of the user authentication application 311 is detected, the user authentication application 311 may transmit (361) a signal for requesting the user authentication to the framework 315 under the control of the electronic device 201. For example, the input for requesting the execution of the user authentication application 311 may include an input for releasing the lock screen, an input for account authentication (e.g., login) in a certain web site, or an input for using a payment service. However, the input is not limited thereto.

In an embodiment of the disclosure, the framework 315 may provide an authentication application programming interface (API) for being able to perform the user authentication based on the signal for requesting the user authentication, being received from the user authentication application 311.

In an embodiment of the disclosure, the framework 315 may transmit the signal for requesting the user authentication to the system service 320 in order to perform the user authentication using the authentication API. The system service 320 may include a face authentication service 321 and a fingerprint authentication service 323. For example, the framework 315 may transmit (363) the signal for requesting the user authentication to the face authentication service 321 so as to be able to perform the user authentication using the face through the authentication API. The framework 315 may transmit (365) the signal for requesting the user authentication to the fingerprint authentication service 323 so as to be able to perform the user authentication using the fingerprint through the authentication API.

Although it has been described that the system service 320 in FIG. 3 according to various embodiments includes the face authentication service 321 and the fingerprint authentication service 323, but is not limited thereto. For example, the system service 320 may include an iris authentication service.

In an embodiment of the disclosure, the face authentication service 321 of the system service 320 may transmit (367) the signal for requesting to perform the user authentication using the face to the face authentication application 346 of the trusted application 345 of the secure world 340 based on the reception (363) of the signal for requesting the user authentication received from the framework 315. The fingerprint authentication service 323 of the system service 320 may transmit (369) the signal for requesting to perform the user authentication using the fingerprint to the fingerprint authentication application 347 of the trusted application 345 of the secure world 340 based on the reception (365) of the signal for requesting the user authentication received from the framework 315.

However, the face authentication service 321 of the system service 320 is not limited to the above-described transmissions, and may transmit a signal for requesting a pause (or end) of the user authentication using the face or a signal for requesting a resume of the user authentication using the face to the face authentication application 346. The fingerprint authentication service 323 of the system service 320 may transmit a signal for requesting a pause (or end) of the user authentication using the fingerprint or a signal for requesting a resume of the user authentication using the fingerprint to the fingerprint authentication application 347.

In an embodiment of the disclosure, the face authentication application 346 of the trusted application 345 may perform the user authentication using the face in response to the signal for requesting to perform the user authentication using the face received from the system service 320, for example, the face authentication service 321, of the normal world 310. The face authentication application 346 may transmit (367) the user authentication result using the face to the face authentication service 321 of the system service 320.

In an embodiment of the disclosure, the fingerprint authentication application 347 of the trusted application 345 may perform the user authentication using the fingerprint in response to the signal for requesting to perform the user authentication using the fingerprint received from the system service 320, for example, the fingerprint authentication service 323, of the normal world 310. The fingerprint authentication application 347 may transmit (369) the user authentication result using the fingerprint to the fingerprint authentication service 323 of the system service 320.

In an embodiment of the disclosure, the face authentication service 321 and the fingerprint authentication service 323 of the system service 320 may perform (375) communication with each other, and may exchange information, such as execution, pause, and resume of the corresponding bio authentication.

In an embodiment of the disclosure, the face authentication service 321 of the system service 320 may manage information related to the face authentication based on the user authentication result using the face. For example, the face authentication service 321 may transmit (371), to the bio authentication management module 325, information about the bio authentication type (e.g., face authentication) used for the user authentication and/or information about the number of user authentications performed using the face authentication based on the user authentication result using the face received from the face authentication application 346 of the trusted application 345.

In an embodiment of the disclosure, the fingerprint authentication service 323 of the system service 320 may manage information related to the fingerprint authentication based on the user authentication result using the fingerprint. For example, the fingerprint authentication service 323 may transmit (373), to the bio authentication management module 325, information about the bio authentication type (e.g., fingerprint authentication) used for the user authentication and/or information about the number of user authentications performed using the fingerprint authentication based on the user authentication result using the fingerprint received from the fingerprint authentication application 347 of the trusted application 345.

In an embodiment of the disclosure, the bio authentication management module 325 may store information about the bio authentication type received from the face authentication service 321 and/or the fingerprint authentication service 323 (e.g., face authentication and fingerprint authentication) and/or information about the number of user authentications performed using the corresponding bio authentication type.

In an embodiment of the disclosure, the CPU controller 330 (e.g., governor) may schedule the process that is performed by the electronic device 201. For example, the system service 320, for example, the face authentication service 321 and/or the fingerprint authentication service 323, may identify (377 and 379) the occupancy rate of the processor 260 allocated by the CPU controller 330 to the process that performs each of a plurality of bio authentications based on the bio authentication management module 325. The system service 320 (e.g., face authentication service 321 and/or fingerprint authentication service 323) may transfer a signal for requesting the adjust of the identified occupancy rate of the processor 260 to the security OS 350 that manages the process of the secure world 340. The security OS 350 may adjust a run time and/or an execution occupancy rate of the face authentication application 346 and/or the fingerprint authentication application 347 based on reception of the signal for requesting to perform the user authentication using the bio information (e.g., face and/or fingerprint) from the system service 320.

The control of the security OS 350 is not limited thereto, and in case of being driven without a separate security OS, the system service 320 (e.g., face authentication service 321 and/or fingerprint authentication service 323) may transfer the signal for requesting the adjust of the occupancy rate of the processor 260 to the CPU controller 330 so that the CPU controller 330 can directly adjust the occupancy rate of the processor 260. The CPU controller 330 may adjust the occupancy rate of the processor 260 allocated to the process that performs each of the plurality of bio authentications (e.g., may control the run time and/or the execution occupancy rate of the face authentication application 346 and/or the fingerprint authentication application 347) based on, for example, the reception of the signal for requesting the adjust of the occupancy rate from the face authentication service 321 and/or the fingerprint authentication service 323. For example, if the usage rate of a specific bio authentication used for a specified period of time among the plurality of bio authentications is higher than the usage rate of at least one other bio authentication, the CPU controller 330 may adjust the occupancy rate (e.g., run time and/or execution occupancy rate) of the processor 260 allocated to the process that performs the specific bio authentication to be heightened based on information related to the bio authentications stored in the bio authentication management module 325 (e.g., information about the bio authentication type used for the user authentication and/or information about the number of user authentications performed by using the bio authentication type.

In an embodiment of the disclosure, the system service 320, for example, the face authentication service 321 and/or the fingerprint authentication service 323, may transmit (381 and 383) a corresponding signal to the notification module 335 so as to output a notification notifying of the existence of the user authentication that is not used for the specified period of time exists. If the bio authentication type that is not used for the specified period of time based on the bio authentication management module 325. The notification module 335 may output the notification notifying that the user authentication that is not used for the specified period of time exists based on the signal received from the system service 320, for example, the face authentication service 321 and/or the fingerprint authentication service 323.

FIG. 4 is a flowchart 400 illustrating a bio authentication method according to an embodiment of the disclosure.

Referring to FIG. 4, in operation 410, an electronic device (e.g., electronic device 201 of FIG. 2) may identify whether a plurality of bio authentications is being performed in case that an input for performing a user authentication using a fingerprint sensor (e.g., fingerprint sensor 250 of FIG. 2) is detected.

In various embodiments of the disclosure, if an input for releasing a lock screen, an input for an account authentication (e.g., login) in a certain web site, or an input for using a payment service is detected, the electronic device 201 may display a graphic element (e.g., user interface (UI)) (e.g., graphic element including an image that resembles a fingerprint) for guiding to be able to perform the fingerprint recognition on one area (e.g., area on which the fingerprint sensor 250 is disposed) of the screen being displayed (e.g., lock screen, web site screen, or payment screen). The display of the graphic element is not limited thereto, and the graphic element for guiding to be able to perform the fingerprint recognition may include a text for guiding the fingerprint recognition area.

In various embodiments of the disclosure, the case where the input for performing the user authentication using the fingerprint sensor 250 is detected may include a case where a touch of a finger is detected on an area where the fingerprint sensor 250 is disposed on the touchscreen display (e.g., touchscreen display 230 of FIG. 2). For example, if the contact of the finger is detected on the graphic element for the fingerprint recognition that is displayed on the touchscreen display 230, the electronic device 201 may identify whether the plurality of bio authentications are being performed.

In various embodiments of the disclosure, the operation of identifying whether the plurality of bio authentications are being performed may be an operation of identifying whether a plurality of bio authentication types are configured in the electronic device 201 as types for performing the user authentication. For example, by configuring the plurality of bio authentication types, a user can use the user authentication suitable to a corresponding situation. For example, under the assumption that the user authentication using the fingerprint and the user authentication using the face are configured as the plurality of bio authentication types, the user may use the user authentication using the face of the plurality of bio authentication types in a situation where the user is unable to use the user's two hands. As another example, in a situation where the user is unable to perform the user authentication using the face (e.g., in case of wearing a mask), the user may use the user authentication using the fingerprint of the plurality of bio authentication types.

In an embodiment of the disclosure, the configured plural bio authentication types may include at least two of the user authentication using the fingerprint, the user authentication using the face, or the user authentication using the iris, but are not limited thereto.

In an embodiment of the disclosure, in case that the plurality of bio authentication types are configured as the types for performing the user authentication, the electronic device 201 may perform the user authentication using the first obtained bio information, for example, the fingerprint information, face information, or iris information. However, in this case, until the user authentication using the specific bio information is completed, an operation for obtaining the bio information that is not used for the user authentication (e.g., other bio information than the specific bio information) may be continuously performed. Accordingly, in case that the plurality of bio authentication types are configured, it may take a longer time in performing the user authentication in comparison to the time consumed to perform the user authentication using one piece of bio information.

In various embodiments of the disclosure, if it is identified that the plurality of bio authentications are being performed, the electronic device 201 may perform operation 420 to be described later in order to reduce the time consumed to perform the user authentication.

In an embodiment of the disclosure, if it is identified that the plurality of bio authentications are being performed, the electronic device 201, in operation 420, may pause the user authentication using the camera 240. For example, the face authentication service (e.g., face authentication service 321 of FIG. 3) included in the system service (e.g., system service 320 of FIG. 3) of the normal world (e.g., normal world 310 of FIG. 3) may transmit a signal for requesting to pause the user authentication to the face authentication application 346 of the trusted application 345 of the secure world 340 based on the reception (e.g., face authentication application 346 of FIG. 3) included in the trusted application (e.g., trusted application 345 of FIG. 3) of the secure world (e.g., secure world 340 of FIG. 3). The fingerprint authentication application 346 may temporarily pause the user authentication using the face based on the signal for requesting the pause of the user authentication used from the face authentication service 321.

In an embodiment of the disclosure, if the fingerprint image obtained by using the fingerprint sensor 250 coincides with a preregistered fingerprint image, the electronic device 201, in operation 430, may perform the user authentication. For example, the electronic device 201 may obtain the fingerprint image of the finger by using the fingerprint sensor 250 based on the detection of the contact of the finger on the fingerprint recognition area (e.g., area where the fingerprint sensor 250 is disposed). The electronic device 201 may compare the obtained fingerprint image with the fingerprint image preregistered in the memory (e.g., the memory 220 of FIG. 2), and if they are the same, the electronic device 201 may perform the user authentication.

The operation of identifying whether the fingerprint image obtained by using the fingerprint sensor 250 in the operation 430 as described above according to an embodiment coincides with the preregistered fingerprint image may be performed through the fingerprint authentication application (e.g., fingerprint authentication application 347 of FIG. 3) included in the trusted application 345 of the secure world 340. The fingerprint authentication application 347 may transfer the result of the user authentication (e.g., success or failure) using the fingerprint to the fingerprint authentication service (e.g., fingerprint authentication service 323 of FIG. 3) of the normal world 310. If it is identified that the user authentication has succeeded, the fingerprint authentication service 323 may complete user authentication using the fingerprint based on the result of the user authentication received from the fingerprint authentication application 347. In an embodiment of the disclosure, the fingerprint authentication service 323 having received the user authentication result (e.g., user authentication failure/success) from the fingerprint authentication application 347 may transmit (e.g., 375 of FIG. 3) the signal for requesting the resume of the user authentication using the face to the face authentication service 321. The face authentication service 321 may transmit the signal for requesting the resume of the user authentication using the face to the face authentication application 346 based on the reception of the signal for requesting the resume of the user authentication using the face from the fingerprint authentication service 323. If the user authentication using the face is resumed, the electronic device 201 may identify whether the input for requesting the user authentication is detected by using the fingerprint sensor 250 and the camera 240.

In an embodiment of the disclosure, the fingerprint authentication service 323 may transfer the result of the user authentication using the fingerprint to the user authentication application 311. If it is identified that the user authentication has failed, the user authentication application 311 may re-request the user authentication using the fingerprint based on the result of the user authentication received from the fingerprint authentication service 323. The operation of the user authentication application 311 is not limited thereto, and if it is identified that the user authentication has failed, the user authentication application 311 may cancel a plurality of bio authentication requests in progress based on the result of the user authentication received from the fingerprint authentication service 323.

In various embodiments of the disclosure, if it is identified that the user authentication is performed by using the fingerprint sensor 250, the electronic device 201 may heighten the speed to perform the user authentication by controlling the other user authentication other than the user authentication using the fingerprint sensor 250, for example, the user authentication using the camera 240, to be paused (e.g., to be temporarily paused).

For example, with reference to Table 1 below, the user authentication time that is consumed in case of performing the plurality of bio authentications (e.g., fingerprint authentication and face authentication) in the related art may be increased by about 56 to 96% in comparison to the user authentication time that is consumed in case of performing the bio authentication only by the fingerprint authentication.

In various embodiments of the disclosure, the user authentication time that is consumed in case of performing the plurality of bio authentications (e.g., fingerprint authentication and face authentication) may be increased by about 7 to 10% in comparison to the user authentication time that is consumed in case of performing the bio authentication only by the fingerprint depending on the pause of the user authentication using the camera 240 in accordance with the detection of the input for performing the user authentication using the fingerprint sensor 250.

It can be identified that the user authentication time that is consumed in case of performing the bio authentication only by the fingerprint depending on the pause of the user authentication using the camera 240 in accordance with the detection of the input for performing the user authentication using the fingerprint sensor 250 according to various embodiments of the disclosure is improved by about 88 to 92% in comparison to the user authentication time in the related art.

TABLE 1

| | Related art | | | Disclosure | | |
| --- | --- | --- | --- | --- | --- | --- |
| Fingerprint | Fingerprint + Face | Difference | Fingerprint | Fingerprint + Face | Difference | Improvement rate |
| About 410 ms | About 730 ms | About 320 ms | About 400 ms | About 440 ms | About 40 ms | About 87.50% |
| About 440 ms | About 850 ms | About 410 ms | About 430 ms | About 460 ms | About 30 ms | About 92.70% |

A bio authentication method of an electronic device 201 according to various embodiments may include: identifying whether a plurality of bio authentications are being performed in case that an input for performing a user authentication using a fingerprint sensor 250 is detected; suspending a user authentication using the camera 240 in case that it is identified that the plurality of bio authentications are being performed; and performing the user authentication in case that a fingerprint image obtained by using the fingerprint sensor 250 coincides with a previously registered fingerprint image.

The bio authentication method of the electronic device 201 according to various embodiments may further include resuming the paused user authentication using the camera 240 in case that processing of the fingerprint image obtained by using the fingerprint sensor 250 is ended.

The bio authentication method of an electronic device 201 according to various embodiments may further include storing information related to a bio authentication type used for the user authentication in the memory 220 of the electronic device 201 based on a result of performing the user authentication.

In various embodiments of the disclosure, the information related to the bio authentication type used for the user authentication may include at least one of information about the bio authentication type used for the user authentication or information about the number of user authentications performed by using the bio authentication type.

In various embodiments of the disclosure, performing the user authentication may include: identifying an occupancy rate of a processor 260 allocated to a process that performs each of the plurality of bio authentications in case that it is identified that the plurality of bio authentications are being performed; and performing the user authentication using the fingerprint sensor 250 based on an occupancy rate of the processor 260.

The bio authentication method of an electronic device 201 according to various embodiments may further include: updating the information related to the bio authentication type used for the user authentication based on a result of performing the user authentication using the fingerprint sensor 250; identifying whether a adjust of the occupancy rate of the processor 260 of the electronic device 201 allocated to the process that performs each of the plurality of bio authentications is necessary; and adjusting the occupancy rate of the processor 260 allocated to the process that performs each of the plurality of bio authentications in case that it is identified that the adjust of the occupancy rate of the processor 260 allocated to the process that performs each of the plurality of bio authentications is necessary.

In various embodiments of the disclosure, identifying whether the adjust of the occupancy rate of the processor 260 may include: identifying that the adjust of the occupancy rate of the processor 260 allocated to the process that performs each of the plurality of bio authentications is necessary based on the updated information related to the bio authentication type used for the user authentication in case that a usage rate of a specific bio authentication used for a specified period of time among the plurality of bio authentications is higher than a usage rate of at least one other bio authentication.

In various embodiments of the disclosure, adjusting the occupancy rate of the processor 260 allocated to the process that performs each of the plurality of bio authentications may include adjusting a run time and/or an execution occupancy rate of each of the plurality of bio authentications allocated to the processor 260 based on the updated information related to the bio authentication type used for the user authentication.

The bio authentication method of an electronic device 201 according to various embodiments may further include: identifying whether a bio authentication type that is not used for a specified period of time exists based on the information related to the bio authentication type used for the user authentication; and outputting a notification notifying of an existence of the bio authentication type that is not used for the specified period of time in case that the bio authentication type that is not used for the specified period of time exists.

The bio authentication method of an electronic device 201 according to various embodiments may further include: obtaining a face image by using the camera 240 in case that the input for performing the user authentication using the fingerprint sensor 250 is not detected; and performing the user authentication in case that the face image obtained by using the camera 240 coincides with a preregistered face image.

Figure 5:
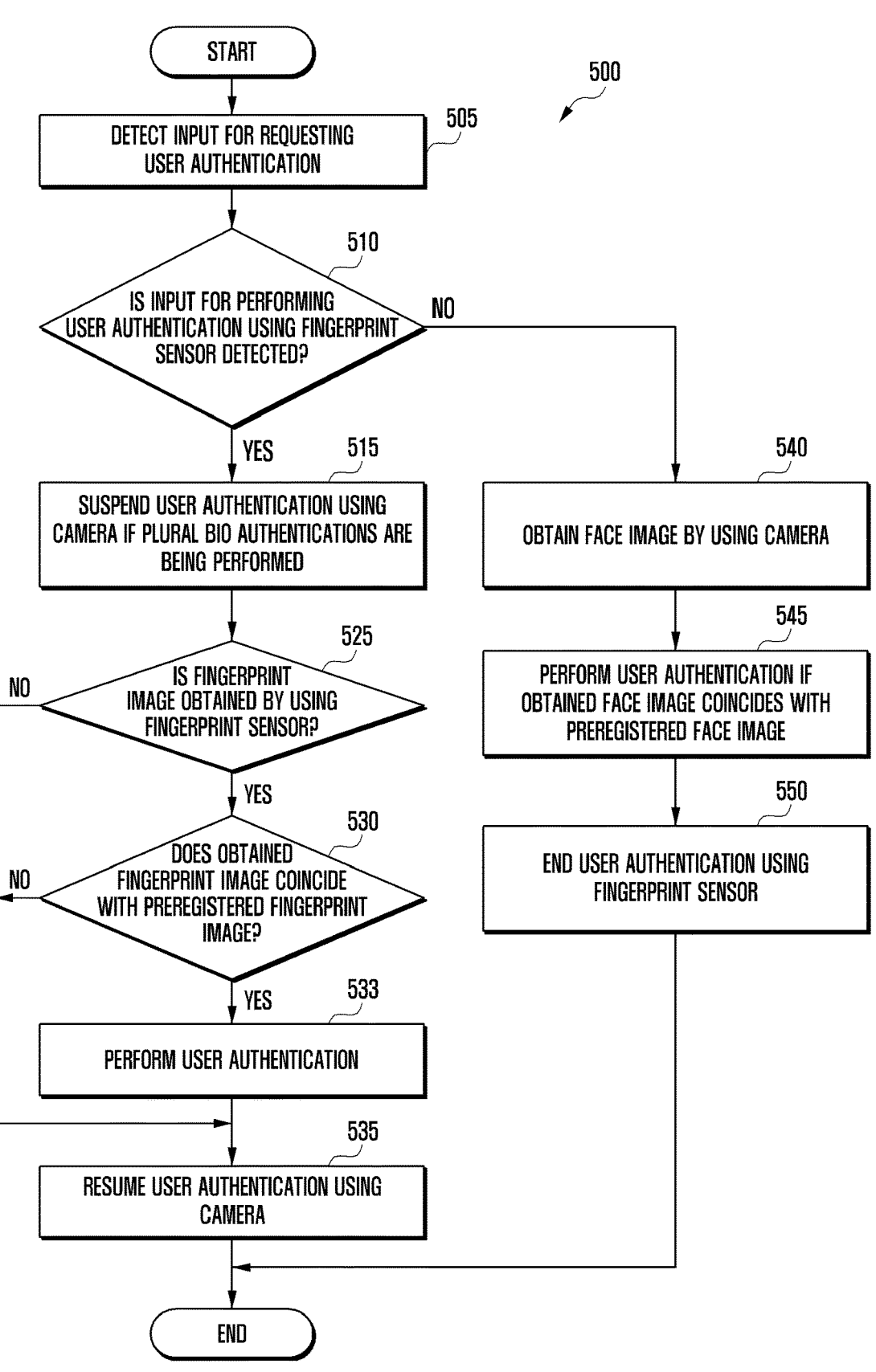
FIG. 5 is a flowchart illustrating a bio authentication method according to an embodiment of the disclosure.

FIG. 5 is a flowchart 500 illustrating a bio authentication method according to an embodiment of the disclosure.

FIG. 5 according to various embodiments may represent detailed operations for the above-described embodiment of FIG. 4.

Since operations 510 to 530 of FIG. 5 according to various embodiments are the same as the operations 410 to 430 of FIG. 4 as described above, the detailed description thereof may be replaced by the description related to FIG. 4.

Referring to FIG. 5, the electronic device (e.g., electronic device 201 of FIG. 2), in operation 505, may detect an input for requesting a user authentication. For example, the input for requesting the user authentication may include an input for releasing a lock screen, an input for account authentication (e.g., login) in a certain web site, or an input for using a payment service. However, the input is not limited thereto.

In an embodiment of the disclosure, the input for requesting the user authentication may include an input for requesting an execution of the user authentication application 311 of FIG. 3 as described above.

In an embodiment of the disclosure, the electronic device 201, in operation 510, may identify whether an input for performing the user authentication is detected by using the fingerprint sensor (e.g., fingerprint sensor 250 of FIG. 2).

In various embodiments of the disclosure, if the input for requesting the user authentication in the operation 505 as described above is detected, the electronic device 201 may display a graphic element (e.g., graphic element including an image that resembles a fingerprint) for guiding to be able to perform a fingerprint recognition on a fingerprint recognition area (e.g., area on which the fingerprint sensor 250 is disposed) and/or a text for guiding the fingerprint recognition area by using the touchscreen display (e.g., touchscreen display 230 of FIG. 2).

The above-described operation 510 according to an embodiment may be an operation of identifying whether a user's finger comes in contact with the fingerprint recognition area. The fingerprint recognition area is an area corresponding to the fingerprint sensor 250 disposed on one surface of the touchscreen display 230, and may be an area on which the fingerprint image is obtained substantially.

In an embodiment of the disclosure, if the input for performing the user authentication using the fingerprint sensor 250 is detected (e.g., YES in operation 510), the electronic device 201, in operation 515, may pause the user authentication using the camera (e.g., the camera 240 of FIG. 2) in case that a plurality of bio authentications are being performed. For example, the operation of identifying whether the plurality of bio authentications are being performed may be an operation of identifying whether a plurality of bio authentication types are configured in the electronic device 201 as the types for performing the user authentication. For example, the configured bio authentication types may include at least two of a user authentication using the fingerprint, a user authentication using a face, or a user authentication using an iris. However, the user authentications are not limited thereto.

In an embodiment of the disclosure, if the plurality of bio authentication types are configured (e.g., if at least two of the user authentication using the fingerprint, the user authentication using the face, or the user authentication using the iris are configured) in the electronic device 201 as the types for performing the user authentication, the electronic device 201 may pause the user authentication using the camera 240 in the operation 515 as described above. For example, if the contact of the finger is detected on the fingerprint recognition area, the electronic device 201 may determine that there is an intention to perform the user authentication using the fingerprint among the plurality of bio authentication types configured by the user, and may pause the user authentication using at least one other bio authentication type (e.g., user authentication using the camera 240).

In an embodiment of the disclosure, the electronic device 201, in operation 525, may identify whether the fingerprint image is obtained by using the fingerprint sensor 250. If it is identified that the fingerprint image is obtained by using the fingerprint sensor 250 (e.g., YES in operation 525), the electronic device 201, at operation 530, may identify whether the obtained fingerprint image coincides with a preregistered fingerprint image. If it is identified that the obtained fingerprint image coincides with the preregistered fingerprint image (e.g., YES in operation 530), the electronic device 201, in operation 533, may perform the user authentication.

In an embodiment of the disclosure, if processing of the fingerprint image obtained by using the fingerprint sensor 250 is ended, the electronic device 201, in operation 535, may resume the user authentication using the camera 240. For example, the processing of the obtained fingerprint image may mean extraction of unique features of the fingerprint from the fingerprint image obtained by using the fingerprint sensor 250. The processing of the obtained fingerprint image is not limited thereto, and may mean a validity check of the obtained fingerprint image. After resuming the user authentication using the camera 240, the electronic device 201 may end the user authentication operation.

In an embodiment of the disclosure, if it is identified that the fingerprint image is not obtained by using the fingerprint sensor 250 (e.g., NO in operation 525), or if it is identified that the obtained fingerprint image does not coincide with the preregistered fingerprint image (e.g., NO in operation 530), the electronic device 201, in operation 535, may resume the user authentication using the camera 240, and may perform detection of the input for requesting the user authentication in the operation 505.

The above-described operation in the operation 535 according to various embodiments may be an operation of resuming the bio authentication type having been paused to obtain the bio information for the user authentication using the plurality of bio authentication types configured by the user in the electronic device 201. For example, the fingerprint authentication service (e.g., fingerprint authentication service 323 of FIG. 3) may receive the authentication result for the authentication failure (e.g., NO in operation 525 or NO in operation 530) or the authentication success (e.g., YES in operation 530) from the fingerprint authentication application (e.g., fingerprint authentication application 347 of FIG. 3). Based on the reception of the authentication result from the fingerprint authentication application 323, the fingerprint authentication service 323 may transmit the signal for requesting the resume of the user authentication using the face to the face authentication service (e.g., face authentication service 321 of FIG. 3). The face authentication service 321 may transmit the signal for requesting the resume of the user authentication to the face authentication application (e.g., face authentication application 346 of FIG. 3).

In an embodiment of the disclosure, the case where the fingerprint image is not obtained by using the fingerprint sensor 250 and/or the fingerprint image obtained by using the fingerprint sensor 250 does not coincide with the pre-registered fingerprint image may include a case where the contact of the finger is not detected on the fingerprint recognition area (e.g., area in which the fingerprint sensor 250 is disposed) and/or a case where a partial touch that occurs when the finger grazes other than the contact of the finger is detected. In this case, since the fingerprint image may fail to be obtained, the bio information (e.g., fingerprint image and/or face image) may be able to be obtained by using the fingerprint sensor 250 and/or the camera 240 by configuring the user authentication using the camera 240 to be resumed in order to perform the user authentication.

In an embodiment of the disclosure, if the input for performing the user authentication using the fingerprint sensor 250 is not detected (e.g., NO in operation 510), the electronic device 201, in operation 540, may obtain the face image by using the camera 240. If the face image obtained by using the camera 240 coincides with the preregistered face image, the electronic device 201, in operation 545, may perform the user authentication.

The operation of obtaining the face image by using the camera and identifying whether the obtained face image coincides with the preregistered face image in the operations 540 and 545 may be performed through the face authentication application (e.g., face authentication application 346 of FIG. 3) included in the trusted application 345 of the secure world 340. The face authentication application 346 may transfer the result (e.g., success or failure) of the user authentication using the face to the face authentication service (e.g., face authentication service 321 of FIG. 3) of the normal world 310. If it is identified that the user authentication has succeeded, the face authentication service 321 may complete the user authentication using the face based on the result of the user authentication received from the face authentication application 346.

In an embodiment of the disclosure, the electronic device 201, in operation 550, may end the user authentication using the fingerprint sensor 250. For example, since the fingerprint sensor 250 may be in a standby state where it waits for the user's contact although the user authentication has been performed through the face image, the electronic device 201 may perform the user authentication using the face image obtained by using the camera 240 in operation 545, and then may end the user authentication using the fingerprint sensor 250 in operation 550.

Figure 6:
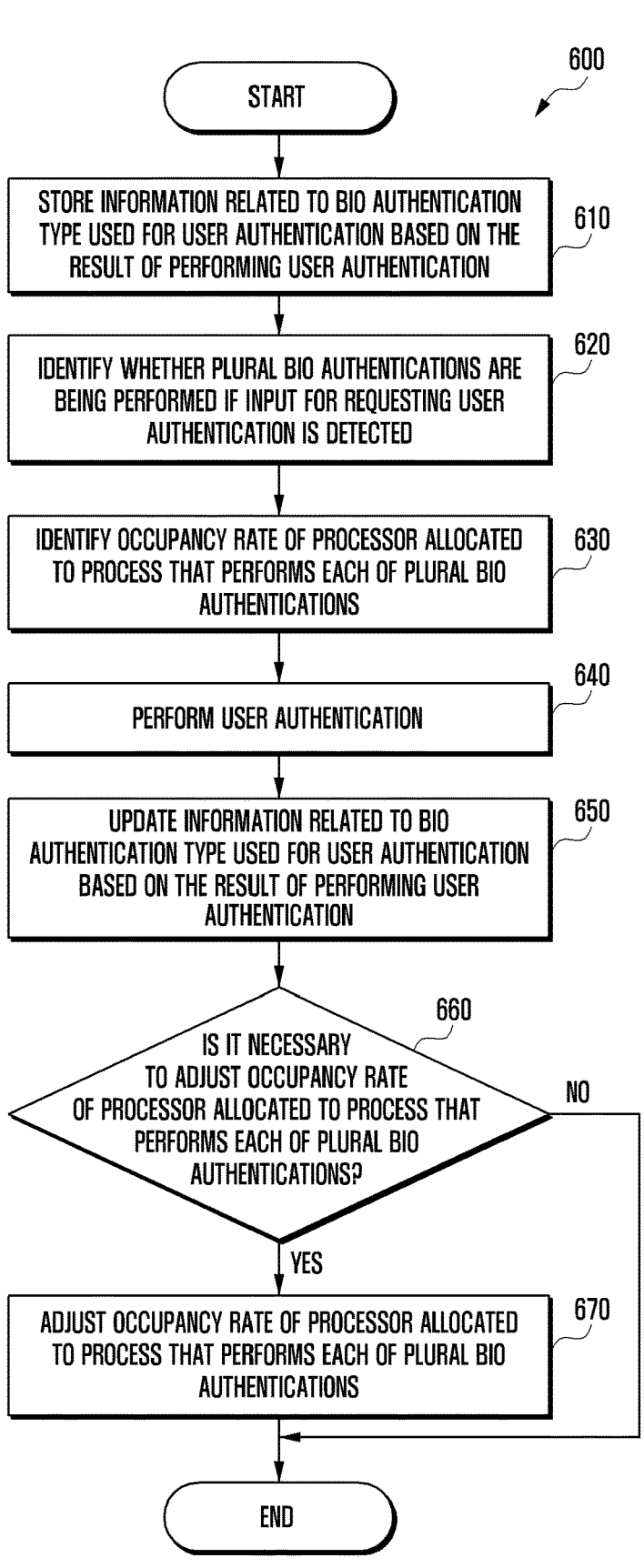
FIG. 6 is a flowchart illustrating a method for adjusting an occupancy rate of a processor allocated to a process of performing a bio authentication according to an embodiment of the disclosure.

FIG. 6 is a flowchart 600 illustrating a method for controlling a usage rate of a processor 260 allocated to a process of performing a bio authentication according to an embodiment of the disclosure.

FIG. 6 according to various embodiments may represent additional operations for the above-described embodiment of FIG. 5.

Referring to FIG. 6, the electronic device (e.g., electronic device 201 of FIG. 2), in operation 610, may store information related to the bio authentication type used for the user authentication based on the result of performing the user authentication. For example, the information related to the bio authentication type used for the user authentication may include information about the bio authentication type used for the user authentication and/or information about the number of user authentications performed by using the bio authentication type. However, the information related to the bio authentication type is not limited thereto.

In various embodiments of the disclosure, the information about the bio authentication type used for the user authentication and/or the information about the number of user authentications performed by using the bio authentication type as described above may be stored in the bio authentication management module (e.g., bio authentication management module 325 of FIG. 3).

In an embodiment of the disclosure, if the input for requesting the user authentication is detected, the electronic device 201, in operation 620, may identify whether the plurality of bio authentications are being performed. For example, the input for requesting the user authentication may include an input for releasing a lock screen, an input for account authentication (e.g., login) in a certain web site, or an input for using a payment service.

In an embodiment of the disclosure, the operation of identifying whether the plurality of bio authentications are being performed may be a type for performing the user authentication in the electronic device 201, and may be an operation of identifying whether the plurality of bio authentication types have been configured (e.g., whether at least two of the user authentication using the fingerprint, the user authentication using the face, or the user authentication using the iris have been configured) in the electronic device 201 as the types for performing the user authentication.

In an embodiment of the disclosure, if it is identified that the plurality of bio authentications are being performed, the electronic device 201, in operation 630, may identify the occupancy rate of the processor (e.g., processor 260 of FIG. 2) allocated to the process that performs each of the plurality of bio authentications.

In an embodiment of the disclosure, based on the allocated occupancy rate of the processor 260, the electronic device 201, in operation 640, may perform the user authentication using the corresponding bio authentication type. For example, if the input for performing the user authentication using the fingerprint sensor (e.g., fingerprint sensor 250 of FIG. 2) is detected, the electronic device 201 may perform the user authentication using the fingerprint sensor 250 (e.g., operations 510 to 530 of FIG. 5) based on the occupancy rate of the processor 260 allocated to the process that performs the user authentication using the fingerprint sensor 250. As another example, if the input for performing the user authentication using the fingerprint sensor 250 is not detected, the electronic device 201 may perform the user authentication using the camera (e.g., the camera 240 of FIG. 2) (e.g., operations 540 to 545 of FIG. 5) based on the occupancy rate of the processor 260 allocated to the process that performs the user authentication using the camera 240.

In an embodiment of the disclosure, the electronic device 201, in operation 650, may update the information related to the bio authentication type used for the user authentication based on the result of performing the user authentication. For example, the electronic device 201, in operation 640, may update the information about the number of performed user authentications stored in the bio authentication management module 325 (e.g., update for increasing the number of used bio authentication types having been performed)

based on the bio authentication type used in the operation 640 and/or the information about the result of performing the user authentication.

In an embodiment of the disclosure, the electronic device 201, in operation 660, may identify whether the adjust of the occupancy rate of the processor 260 allocated to the process that performs each of the plurality of bio authentications is necessary. If it is identified that the adjust of the occupancy rate of the processor 260 allocated to the process that performs each of the plurality of bio authentications is necessary (e.g., YES in operation 660), the electronic device 201, in operation 670, may adjust the occupancy rate of the processor 260 allocated to the process that performs each of the plurality of bio authentications. For example, the operation of adjusting the occupancy rate of the processor 260 allocated to the process that performs each of the plurality of bio authentications may be an operation of adjusting a run time and/or an execution occupancy rate of the face authentication application (e.g., face authentication application 346 of FIG. 3) and/or the fingerprint authentication application (e.g., fingerprint authentication application 347 of FIG. 3).

For example, if a usage rate of a specific bio authentication used for a specified period of time among the configured plural bio authentications is higher than a usage rate of at least one other bio authentication, the electronic device 201 may adjust the occupancy rate of the processor 260 allocated to the process that performs the specific bio authentication to be heightened based on the updated information related to the bio authentication type used for the user authentication.

The operation of adjusting the occupancy rate of the processor 260 in the above-described operation 670 according to various embodiments may be performed by the above-described CPU controller 330 of FIG. 3. The operation of adjusting the occupancy rate of the processor 260 in the above-described operation 670 is not limited thereto, and may be performed by the above-described security OS 350 of FIG. 3.

In various embodiments of the disclosure, in order to perform each process of the plurality of bio authentications, the minimum occupancy rate may be necessary, and the above-described operation in the operation 670 may be an operation of adjusting the occupancy rate of the processor 260 allocated to the process that performs each of the plurality of bio authentications with a value that exceeds the minimum occupancy rate.

In an embodiment of the disclosure, if it is not identified that the adjust of the occupancy rate of the processor 260 allocated to the process that performs each of the plurality of bio authentications is necessary (e.g., NO in operation 660), the electronic device 201 may end the operation of adjusting the occupancy rate of the processor 260.

In various embodiments of the disclosure, it is described that the CPU occupancy rate is controlled, but the control is not limited thereto. For example, if the usage rate of the specific bio authentication used for the specified period of time among the configured plural bio authentications is higher than the usage rate of at least one other bio authentication, the electronic device 201 may configure the priority of the specific bio authentication to be higher than the priority of the at least one other bio authentication so as to be able to perform the user authentication by using the specific bio authentication having the higher priority.

In various embodiments of the disclosure, the usability of the specific bio authentication among the plurality of bio authentications may be heightened. In this case, the CPU controller 330 (or security OS 350) may dynamically adjust to heighten the occupancy rate of the processor 260 for the specific bio authentication having the high usability based on the above-described embodiment of FIG. 6. As the occupancy rate of the processor 260 for the specific bio authentication that is suitable to the usage pattern of the user who uses the electronic device 201 is configured to be heightened, the electronic device 201 may perform the specific bio authentication having the high usability. Accordingly, the time consumed to perform the user authentication may be shortened.

Figure 7:
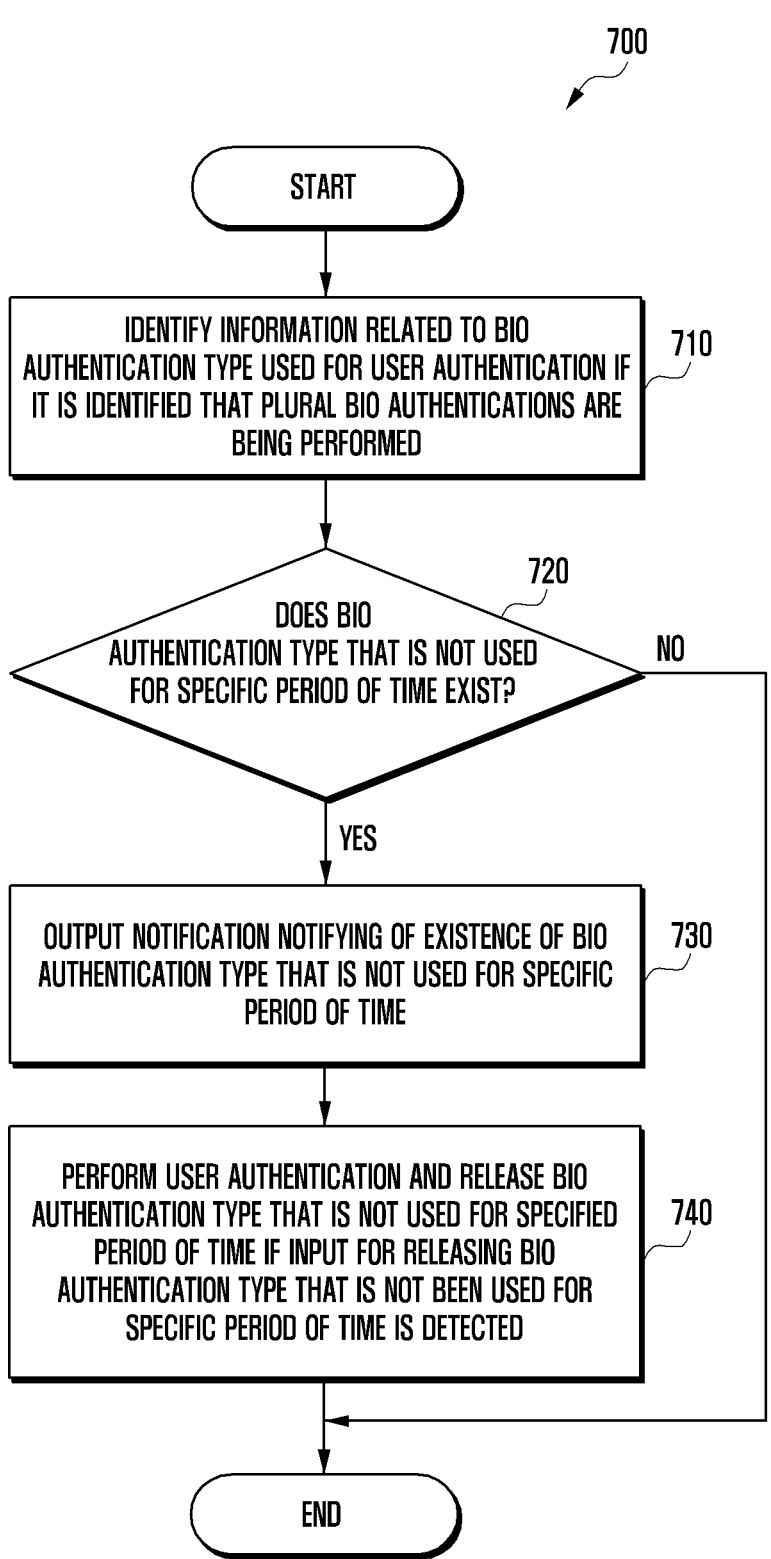
FIG. 7 is a flowchart illustrating a method for providing a notification notifying of a bio authentication type that is not used for a specified period of time according to an embodiment of the disclosure.

FIG. 7 is a flowchart 700 illustrating a method for providing a notification notifying of a bio authentication type that is not used for a specified period of time according to an embodiment of the disclosure.

FIG. 7 according to various embodiments may represent additional operations for the above-described embodiment of FIG. 5. The operation of FIG. 7 according to various embodiments is not limited thereto, and may be performed at a specified time interval (e.g., 7 days or 14 days).

Referring to FIG. 7, if it is identified that the plurality of bio authentications is being performed, the electronic device (e.g., electronic device 201 of FIG. 2), in operation 710, may identify the information related to the bio authentication type used for the user authentication. For example, if the plurality of bio authentication types are configured (e.g., if at least two of the user authentication using the fingerprint, the user authentication using the face, or the user authentication using the iris are configured) in the electronic device 201 as the types for performing the user authentication, the electronic device 201 may identify the information related to the bio authentication type used for the user authentication that is stored in the bio authentication management module (e.g., bio authentication management module 325 of FIG. 3). For example, the information related to the bio authentication type used for the user authentication may include the information about the bio authentication type used for the user authentication and/or the information about the number of user authentications performed by using the bio authentication type.

In an embodiment of the disclosure, based on the information related to the bio authentication type used for the user authentication, the electronic device 201, in operation 720, may identify whether the bio authentication type that is not used for the specified period of time exists. If the bio authentication type that is not used for the specified period of time exists (e.g., YES in operation 720), the electronic device 201, in operation 730, may output a notification notifying of the existence of the bio authentication type that is not used for the specified period of time.

In various embodiments of the disclosure, the above-described operation in the operation 730 may be performed by the above-described notification module 335 of FIG. 3.

In various embodiments of the disclosure, the electronic device 201 may output the notification notifying of the existence of the bio authentication type that is not used for the specified period of time through the touchscreen display (e.g., touchscreen display 230 of FIG. 2), the speaker (e.g., sound output module 155 of FIG. 1), and/or the haptic module (e.g., haptic module 179 of FIG. 1).

For example, the electronic device 201 may display a user interface including a text for notifying of the existence of the bio authentication type that is not used for the specified period of time (e.g., "Face authentication has not been used for a specified period of time."), or a text for guiding the release of the bio authentication type that is not used for the specified period of time (e.g., "Face authentication has not been used for a specified period of time. Please release the user authentication using the face authentication," or "Face authentication has not been used for a specified period of time. In case of releasing the user authentication using the face authentication, you can quickly perform the user authentication using the fingerprint authentication") by using the touchscreen display 230.

The display of the user interface is not limited thereto, the electronic device 201 may output a notification notifying of the existence of the bio authentication type that is not used for the specified period of time or a notification guiding the release of the bio authentication type that is not used for the specified period of time as sound through the speaker 155 (or as vibrations through the haptic module 179).

In an embodiment of the disclosure, if the input for releasing the bio authentication type that is not used for the specified period of time is detected, the electronic device 201, in operation 740, may perform the user authentication, and may release the bio authentication type that is not used for the specified period of time.

For example, the operation of performing the user authentication in case that the input for releasing the bio authentication type that is not used for the specified period of time is detected may be an operation of identifying whether a user having requested the release of the bio authentication type is the same as the user of the electronic device 201 in order to prevent another user who is not the user of the electronic device 201 from releasing the bio authentication type.

The user authentication that is performed in the above-described operation 740 according to an embodiment may include at least one of a bio authentication (e.g., user authentication using the fingerprint and user authentication using the face), a lock pattern, a passcode, or a personal identification number (PIN).

In an embodiment of the disclosure, if it is identified that the user authentication has succeeded based on the result of performing the user authentication as described above, the electronic device 201 may release the bio authentication type that is not used for the specified period of time. For example, if the performed user authentication is the bio authentication, the electronic device 201 may compare the fingerprint image (or face image) obtained by using the fingerprint sensor 250 (or the camera 240) with the preregistered fingerprint image (or preregistered face image), and if they are the same, the electronic device 201 may determine that the user authentication has succeeded, and may release the bio authentication type that is not used for the specified period of time. As another example, if the performed user authentication is the pattern password (or passcode or PIN), the electronic device 201 may compare the input pattern password (or passcode or PIN) with the preregistered pattern password (or passcode or PIN), and if they are the same, the electronic device 201 may determine that the user authentication has succeeded, and may release the bio authentication type that is not used for the specified period of time.

In an embodiment of the disclosure, if the bio authentication type that is not used for the specified period of time does not exist (NO in operation 720), the electronic device 201 may end the operation of FIG. 7.

In various embodiments of the disclosure, if the user authentication using a specific bio authentication is performed according to the above-described embodiments of FIGS. 5 and 6, the user authentication using at least one other bio authentication may not be performed. For example, if the user authentication using the fingerprint is used and the user authentication using the face is not used among the user authentications using the face and the fingerprint configured by the plurality of bio authentications, the electronic device 201 may guide to be able to release the user authentication using the face. Accordingly, since the user can perform the user authentication using the fingerprint that is the mainly used user authentication method, the time consumed to perform the user authentication can be shortened, and the bio recognition performance can also be improved.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a fingerprint sensor;
a camera; and
a processor operatively connected to the fingerprint sensor and the camera,
wherein the processor is configured to:
identify whether a plurality of bio authentications are being performed in case that an input for performing a user authentication using the fingerprint sensor is detected,
suspend a user authentication using the camera in case that it is identified that the plurality of bio authentications are being performed, and
perform the user authentication in case that a fingerprint image obtained by using the fingerprint sensor coincides with a previously registered fingerprint image.

2. The electronic device of claim 1, wherein the processor is further configured to:
resume the suspended user authentication using the camera in case that processing of the fingerprint image obtained by using the fingerprint sensor is ended.

3. The electronic device of claim 1, further comprising:
a memory,
wherein the processor is further configured to:
store, based on a result of performing the user authentication, information related to a bio authentication type used for the user authentication in the memory.

4. The electronic device of claim 3, wherein information related to the bio authentication used for the user authentication includes at least one of information about the bio authentication type used for the user authentication or information about a number of user authentications performed using the bio authentication type.

5. The electronic device of claim 4, wherein the processor is further configured to:
identify an occupancy rate of the processor allocated to a process that performs each of the plurality of bio authentications in case that it is identified that the plurality of bio authentications are being performed, and
perform, based on the occupancy rate of the processor, the user authentication using the fingerprint sensor.

6. The electronic device of claim 5, wherein the processor is further configured to:
update, based on the result of performing the user authentication using the fingerprint sensor, the information related to the bio authentication type used for the user authentication,
identify whether an adjust of the occupancy rate of the processor allocated to the process that performs each of the plurality of bio authentications is necessary, and
adjust the occupancy rate of the processor allocated to the process that performs each of the plurality of bio authentications in case that it is identified that the adjust of the occupancy rate of the processor allocated to the process that performs each of the plurality of bio authentications is necessary.

7. The electronic device of claim 6, wherein the processor is further configured to:
identify that the adjust of the occupancy rate of the processor allocated to the process that performs each of the plurality of bio authentications is necessary in case that a usage rate of a specific bio authentication used for a specified period of time among the plurality of bio authentications is higher than a usage rate of at least one other bio authentication based on the updated information related to the bio authentication type used for the user authentication.

8. The electronic device of claim 6, wherein the processor is further configured to:
adjust, based on the updated information related to the bio authentication type used for the user authentication, at least one of a run time or an execution occupancy rate of each of the plurality of bio authentications allocated to the processor.

9. The electronic device of claim 3, wherein the processor is further configured to:
identify, based on the information related to the bio authentication type used for the user authentication, whether a bio authentication type that is not used for a specified period of time exists, and
output a notification notifying of an existence of the bio authentication type that is not used for the specified period of time in case that the bio authentication type that is not used for the specified period of time exists.

10. The electronic device of claim 1, wherein the processor is further configured to:
obtain a face image by using the camera in case that the input for performing the user authentication using the fingerprint sensor is not detected, and
perform the user authentication in case that the face image obtained by using the camera coincides with a previously registered face image.

11. A bio authentication method of an electronic device, the method comprising:
identifying whether a plurality of bio authentications are being performed in case that an input for performing a user authentication using a fingerprint sensor is detected;
suspending a user authentication using a camera in case that it is identified that the plurality of bio authentications are being performed; and
performing the user authentication in case that a fingerprint image obtained by using the fingerprint sensor coincides with a previously registered fingerprint image.

12. The method of claim 11, further comprising:
resuming the suspended user authentication using the camera in case that processing of the fingerprint image obtained by using the fingerprint sensor is ended.

13. The method of claim 11, further comprising:
storing, based on a result of performing the user authentication, information related to a bio authentication type used for the user authentication in a memory of the electronic device.

14. The method claim 13, wherein information related to the bio authentication used for the user authentication includes at least one of information about the bio authentication type used for the user authentication or information about a number of user authentications performed using the bio authentication type.

15. The method of claim 13, wherein the performing of the user authentication further comprises:

identifying an occupancy rate of a processor allocated to a process that performs each of the plurality of bio authentications in case that it is identified that the plurality of bio authentications are being performed; and performing, based on an occupancy rate of the processor, the user authentication using the fingerprint sensor.

16. The method of claim 15, wherein the performing of the user authentication further comprises:

updating, based on a result of performing the user authentication using the fingerprint sensor, the information related to the bio authentication type used for the user authentication;

identifying whether an adjust of the occupancy rate of the processor allocated to the process that performs each of the plurality of bio authentications is necessary; and adjusting the occupancy rate of the processor allocated to the process that performs each of the plurality of bio authentications in case that it is identified that the adjust of the occupancy rate of the processor allocated to the process that performs each of the plurality of bio authentications is necessary.

17. The method of claim 16, wherein the identifying of whether the adjust of the occupancy rate of the processor comprises:

identifying that the adjust of the occupancy rate of the processor allocated to the process that performs each of the plurality of bio authentications is necessary in case that a usage rate of a specific bio authentication used for a specified period of time among the plurality of bio authentications is higher than a usage rate of at least one other bio authentication based on the updated information related to the bio authentication type used for the user authentication.

18. The method of claim 16, wherein the adjusting of the occupancy rate of the processor allocated to the process that performs each of the plurality of bio authentications comprises:

adjusting, based on the updated information related to the bio authentication type used for the user authentication, at least one of a run time or an execution occupancy rate of each of the plurality of bio authentications allocated to the processor.

19. The method of claim 13, further comprising:

identifying, based on the information related to the bio authentication type used for the user authentication, whether a bio authentication type that is not used for a specified period of time exists; and outputting a notification notifying of an existence of the bio authentication type that is not used for the specified period of time in case that the bio authentication type that is not used for the specified period of time exists.

20. The method of claim 11, further comprising:

obtaining a face image by using the camera in case that the input for performing the user authentication using the fingerprint sensor is not detected; and performing the user authentication in case that the face image obtained by using the camera coincides with a previously registered face image.

* * * * *